United States Patent Office 3,651,073
Patented Mar. 21, 1972

3,651,073
CERTAIN POLYFLUOROISOALKOXY-ALKOXY-METHYL PYRIDINIUM COMPOUNDS
Aziz Urrehman Kahn, Elizabeth, Alson Kay Price, Morristown, and Richard Francis Sweeney, Dover, N.J., assignors to Allied Chemical Corporation, New York, N.Y.
No Drawing. Filed Apr. 14, 1969, Ser. No. 816,012
Int. Cl. C07d 31/28
U.S. Cl. 260—297 R          11 Claims

ABSTRACT OF THE DISCLOSURE

Halomethyl ethers of polyfluoroisoalkyloxyalkyl alcohols characterized in that an ether oxygen links a fluorinated carbon atom attached to two fluoroalkyl groups and at least one —$CF_2$— group. These compounds are useful as oil repellency agents and as intermediates for the preparation of their corresponding quaternary ammonium salts useful as oil and water repellency and surface active agents.

---

This invention relates to halomethyl ethers of polyfluoroisoalkoxyalkyl alcohols and their quaternary ammonium salts useful as surface active agents and as treating agents to impart oil and water resistance to various substrates.

The halomethyl ethers of the invention have the formula (1) 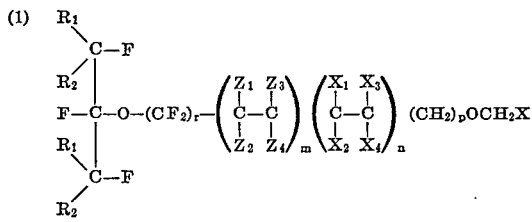

wherein $R_1$ and $R_2$ independently at each occurrence can be fluorine, chlorine, perfluoroalkyl or together can form a cyclic perfluoroalkylene group with the proviso that both $R_1$ and $R_2$ are not chlorine; $Z_1$, $Z_2$, $Z_3$ and $Z_4$ independently can be fluorine, chlorine or hydrogen with the proviso that no more than two of $Z_1$–$Z_4$ are chlorine; $X_1$, $X_2$, $X_3$ and $X_4$ independently can be fluorine, chlorine or hydrogen with the proviso that no more than one of $X_1$–$X_4$ is chlorine; $r$ is an integer from 1–2; $m$ and $n$ are integers from 0–75; the sum of $m$ and $n$ is 0–75; $p$ is an integer from 0–1 providing that when $p$ is 0, $n$ must be at least one and $X_3$ and $X_4$ must be hydrogen and X is a halogen. These compounds are useful to impart oil resistance to a variety of substrates, particularly textiles. Preferably $m$ and $n$ are integers from 0–10.

The above-described halomethyl ethers are also intermediates for the preparation of their corresponding quaternary ammonium salts of the formula (2) 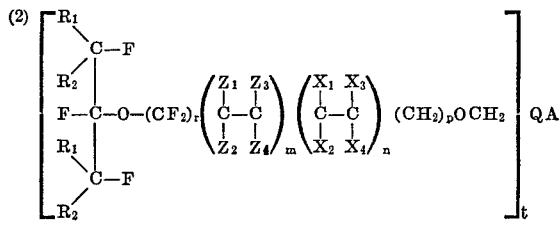

wherein $R_1$, $R_2$, $Z_1$–$Z_4$, $X_1$–$X_4$, $r$, $m$, $n$ and $p$ have the meanings given above, Q is a positively charged residue of a nitrogen-containing quaternizing agent, A is an accompanying anionic moiety with the proviso that when the number of negative charges of A exceeds one, A can be attached to an additional residue which can be Q or a positively charged tertiary nitrogenous base; and $t$ is an integer from one up to the total number of negative charges on A.

The critical structure in the above-described compounds is in the polyfluoroisoalkoxyalkyl tail portion of the molecule wherein an ether oxygen atom links a fluorinated carbon atom attached to two fluoroalkyl groups and at least one —$CF_2$— group.

Preferred compounds of the invention are polyfluoroisoalkoxyalkoxymethyl quaternary ammonium salts of the formula

wherein $R'_f$ is

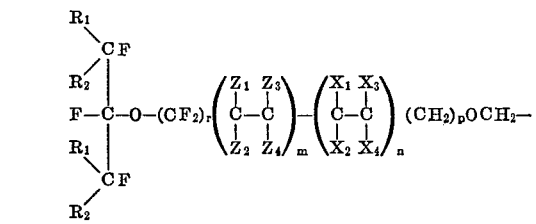

wherein $R_1$, $R_2$, $Z_1$–$Z_4$, $X_1$–$X_4$, $r$, $m$, $n$ and $p$ have the meanings given above; Q is the positively charged residue of a pyridine quaternizing agent, and A is an accompanying anion with the proviso that when the number of negative charges of A exceeds the positive charge of $R'_fQ$, the excess negative charge is satisfied by cations selected from the group consisting of $R'_fQ$ and a positively charged protonated tertiary amine cation.

The halomethyl ethers of the invention are prepared by reaction of an appropriate polyfluoroisoalkoxyalkyl alcohol with a hydrogen halide or thionyl halide and formaldehyde in known manner. The resultant halomethyl ethers can be isolated or can be further reacted with a quaternizing agent to form the corresponding water-soluble quaternary ammonium salts.

The alcohols useful in preparing the compounds of the invention have the formula (3) 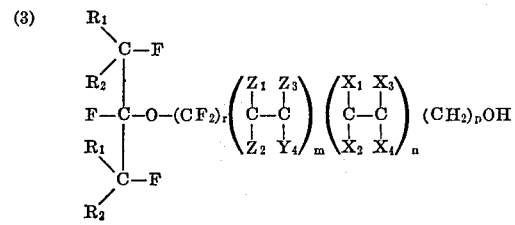

wherein $R_1$, $R_2$, $Z_1$–$Z_4$, $X_1$–$X_4$, $r$, $m$, $n$ and $p$ have the meanings given above. These alcohols are prepared from polyfluoroisoalkoxytetrafluoroethyl iodides of the formula (4) 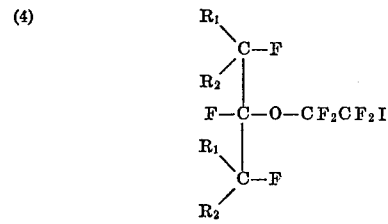

wherein $R_1$ and $R_2$ have the meanings given above. These iodides are prepared by reacting an appropriate ketone with an ionizable fluoride salt, e.g., CsF or KF to form a fluorinated organic salt which is reacted with tetrafluoroethylene and iodine. These reactions are described in copending applications of Litt et al., Ser. No. 492,276, filed Oct. 1, 1965 now U.S. Pat. No. 3,453,333 dated July 1, 1969 and Ser. No. 513,574, filed Dec. 13, 1965 now U.S. Pat. No. 3,470,256 dated Sept. 30, 1969. The pertinent subject matter of these applications is hereby incorporated by reference.

The iodides of Formula 4 can be reacted with unsaturated compounds having the formulas $Z_1Z_2C=CZ_3Z_4$ and/or $X_1X_2C=CX_3X_4$ wherein $Z_1-Z_4$ and $X_1-X_4$ are as described hereinabove. Suitable unsaturated compounds include for example ethylene, difluoroethylene, difluorochloroethylene, trifluoroethylene, tetrafluoroethylene and the like. These reactions can be initiated by heat, e.g. temperatures from about 100° C. to about 350° C., preferably from about 150–200° C., or by a free radical initiator, e.g., azobisisobutyronitrile, benzoyl peroxide and the like. These reactions are described in greater detail in copending application of Anello et al. Ser. No. 633,359 filed Apr. 25, 1967, now U.S. Pat. No. 3,514,487 dated Apr. 26, 1970. The pertinent subject matter of this application is hereby incorporated by reference.

The preferred class of polyfluoroisoalkoxyalkyl alcohols for use in the invention have the formula (5)

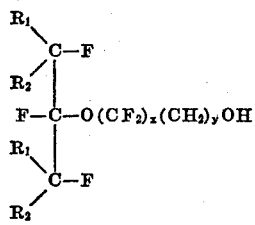

wherein $R_1$ and $R_2$ can be fluorine, chlorine or perfluoroalkyl of 1–2 carbon atoms providing both $R_1$ and $R_2$ are not chlorine, and $x$ and $y$ are integers from 1–20.

Depending upon the values of $x$ and $y$, the preferred methods of preparing these alcohols from the iodides will vary.

When $x$ in Formula 5 is an odd integer from 1–19 and $y$ is 1, an alkyl iodide wherein $x$ is 2–20 and $y$ is 0 can be reacted with $SO_3$ to form a mixture of the acyl halide and perhaloalkoxyfluoroalkyl pyrosulfuryl fluoride; this mixture can be reacted with an alcohol to form the ester; and the ester can be reduced to the desired alcohol with $LiAlH_4$.

When $x$ in Formula 5 is an even integer from 2–20 and $y$ is 1, an iodide having two terminal —$CH_2$— groups can be reacted with alcoholic KOH to form an ethene; the ethene can be oxidized with $KMnO_4$ to an acid; the acid can be esterified with an alkanol; and the ester can be reduced to the desired alcohol with $LiAlH_4$.

When $x$ in Formula 5 is an even integer from 2–20, and $y$ is odd or even from 3–20, the appropriate fluoro iodide can be reacted with an unsaturated alkanol of the formula $CH_2=CH(CH_2)_{y-2}OH$ to form the corresponding iodo alcohol which can be reduced to the desired alcohol with zinc and an alkanol.

When $x$ in Formula 5 is an even integer from 2–20 and $y$ is 1–3, the iodide can be reacted with $SO_3$ to form the pyrosulfate or with oleum to form the hydrosulfate; and the pyrosulfate or hydrosulfate can be hydrolyzed with aqueous acid to form the desired alcohol.

When $x$ in Formula 5 is an odd integer from 1 to 19 and $y$ is an odd or even integer from 2 to 20, the iodide can be reacted to form an acid having an odd number of —$CF_2$— groups, the acid can be reacted with silver oxide to form a perhaloisoalkoxyperfluoroalkyl iodide; the iodide can be reacted with an unsaturated alcohol such as allyl alcohol, and the resultant iodoalcohol can be reduced to the desired alcohol with zinc and an alkanol.

The polyfluoroisoalkoxyalkyl alcohols and methods of preparing them are described in greater detail in copending application of Anello et al., Ser. No. 721,089, filed Apr. 12, 1968, now abandoned. Mixtures of more than one alcohol can be employed in the invention.

The polyfluoroisoalkoxyalkyl alcohols as described above are reacted with a hydrogen halide, such as hydrogen fluoride, hydrogen chloride, hydrogen bromide, hydrogen iodide and the like or a thionyl halide and formaldehyde, preferably in the presence of a condensing agent.

Suitable sources for formaldehyde include anhydrous or aqueous formaldehyde, paraformaldehyde and trioxane. At least one mol of formaldehyde per mol of alcohol is required for complete reaction, but an excess is generally employed of from about 2–10 mols of formaldehyde per mol of alcohol.

Suitable condensing agents are known and include metallic halides, such as zinc chloride, lithium chloride and the like. They are generally employed in amounts of from 0.1–1.0 mol per mol of alcohol to increase the yield of the halomethyl ether product.

A suitable solvent is generally employed for this reaction, but is not required. Suitable solvents are those in which the alcohol starting material is soluble and include benzene, toluene, trichlorotrifluoroethane, water and the like. Trichlorotrifluoroethane is the preferred solvent when the alcohol reactant contains fifteen or more fluorinated carbon atoms.

The order of addition of the reactants is not critical but preferably the hydrogen halide reactant is bubbled through a mixture of the alcohol, formaldehyde and optional condensing agent and solvent until no further absorption of the hydrogen halide occurs.

The temperature of reaction is not critical and is generally maintained at room temperature to about 70° C. although higher or lower temperatures can be employed if desired.

The reaction is generally complete in about 1–3 hours, but longer reaction times, up to 5 hours or more, may be required for complete reaction when higher molecular weight alcohol reactants are employed.

The halomethyl ethers of the invention can be isolated from the reaction mixture in known manner, as by distillation. These compounds are useful to prepare oil repellent articles. These articles are prepared by applying the compound to a variety of substrates, including paper, textiles, leather, glass, plastic, wood, metal and like surfaces. The compounds of the invention can be applied from organic solution or aqueous dispersion as will be known to one skilled in the art. They can be applied also as an aerosol spray. The substrate to be rendered oil repellent can be treated with a catalyst if desired to facilitate adherence of the halomethyl ether to the substrate. In some cases, heat will be effective to improve adherence of the coating to the substrate.

The halomethyl ethers of the invention can be further reacted with a nitrogen-containing quaternizing agent to form quaternary ammonium salts. Suitable quaternizing agents are well known and include for example nitrogenous bases and thiourea. Nitrogenous bases suitable in the invention include trialkyl amines such as trimethylamine, triethylamine, tributyl amine, tridodecylamine, methyldiethylamine, dimethylhexylamine and the like; hydroxyalkyl amines such as hydroxyethyldimethylamine, trihydroxyethylamine, N-hydroxyethylaziridine polymer and the like; cycloalkyl amines such as dimethylcyclohexylamine, ethyldicyclohexylamine, tricyclohexlamine and the like; aromatic amines such as benzyldimethylamine, dimethylaniline, di-n-propylaniline and the like; heterocyclic amines such as pyridine, 4-methylpyridine, 4-hydroxyethylpyridine, quinoline, picoline, lutidine, morpholine, piperidine, piperazine, N-(2-aminoethyl)morpholine,N, N′-bis(3-aminopropyl)piperazine and the like. Polyfunctional amines can be employed, such as amines of the formula

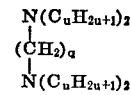

wherein $n$ is an integer from 1–5 and $q$ is an integer from 1–3. In such case the amine contains more than one reactive nitrogen atom, and one mol of amine can be reacted with two mols of the halomethyl ethers of the invention. Pyridine is particularly preferred in the preparation of textile treating agents since it is readily available and inexpensive.

A solvent can be employed for this reaction which can be an excess of the quaternizing agent, benzene, toluene, trichlorotrifluoroethane and the like.

Generally an excess of the quaternizing agent is employed. The temperature is not critical and is generally from about 0–70° C. most conveniently; the reactants can be admixed at room temperature. The reaction is generally complete in a short time, from about 5 minutes to an hour, but longer reaction times may be required for less reactive, high molecular weight halomethyl ethers.

Quaternary ammonium compounds can also be prepared directly from polyfluoroisoalkoxyalkyl alcohols by treatment with formaldehyde and a tertiary nitrogenous base in the presence of $SO_2$, or a compound convertible to $SO_2$ such as potassium sulfite, to form the corresponding sulfite and pyrosulfite quaternary ammonium compounds. This reaction can be illustrated by the following equation, using pyridine as the tertiary nitrogenous base and wherein $R_f$ represents a polyfluoroisoalkoxyalkyl radical:

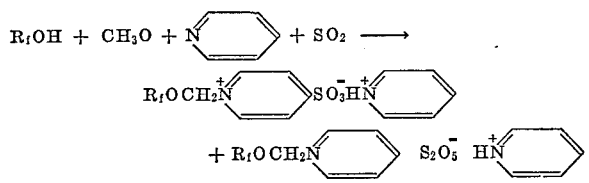

The quaternary ammonium compounds can also be prepared directly by reacting the polyfluoroisoalkoxyalkyl alcohols with formaldehyde and a halide salt of a tertiary nitrogenous base. The base is employed as solvent for the reaction. This reaction is desirably carried out at elevated temperatures of from about 70° C. to reflux, preferably 80–100° C., for from about one-half to one hour or longer. Longer reaction times may be required for the higher molecular weight, less reactive alcohols.

The quaternary ammonium salts can be isolated in known manner and can be further purified if desired by triturating with a suitable solvent, such as ether, or recrystallizing from a solvent such as acetonitrile, chloroform and the like, as will be known to one skilled in the art.

The quaternary ammonium salts of the invention are useful oil and water repellents, particularly for papers and fabrics and are highly effective surface active agents. When added to water or aqueous solutions, these salts lower the surface tension of the solution materially. They can also be added to organic solutions to lower surface tension. Such solutions include hydrocarbon solvents such as benzene, toluene or xylene, halogenated hydrocarbon such as trichloroethane or carbon tetrachloride; and solvents such as dimethylformamide and dimethylsulfoxide. The quaternary ammonium compounds of the invention are also useful as leveling agents in wax formulations; stabilizing agents in water-hydrocarbon emulsions; wetting agents in dye solutions to improve the dyeing of fibers; foaming agents; agents to increase the solubility, detergency and wetting properties of aqueous and organic solutions; and agents to lower the coefficients of friction of treated substrates.

These compounds can be used alone as oil and water repellents, or can be used in combination with other known finishes such as mildew preventatives, moth resistance agents, crease resistance resins, lubricants, softeners, sizes, flame retardants, antistatic agents, dye fixatives and the like.

In the treatment of paper, the quaternary ammonium salts can be added as an ingredient in a wax, starch, casein, elastomer or wet strength resin formulation.

The invention will be further illustrated by the following examples, but it is to be understood that the invention is not meant to be limited to the details described therein. In examples, all parts and percentages are by weight unless otherwise noted.

EXAMPLE 1

4 - heptafluoroisopropoxy-3,3,4,4-tetrafluorobutyl iodide (38 parts) was charged to a flask fitted with a stirrer, dropping funnel, thermometer and condenser. 28 parts of stabilized $SO_3$ were added slowly, maintaining the temperature at 35–40° C. Iodine precipitated during the reaction. The mixture was heated at 70° C. for two hours, cooled to room temperature and 100 parts by volume of 35% sulfuric acid added slowly. A small amount of sodium sulfite was added to remove elemental iodine and the mixture heated at 105° C. for one hour. The two layers were separated, the aqueous layer washed with ether and the ether combined with the organic layer. The solution was distilled.

A 70% yield (19 parts) of 4-heptafluoroisopropoxy-3,3,4,4-tetrafluorobutyl alcohol was recovered having a boiling point of 84° C./59 mm.

The alcohol prepared as above (50 parts) was dissolved in 35 parts of benzene and 9.12 parts of trioxane and 6 parts of zinc chloride suspended into the solution. The temperature was lowered to 10° C. and a slow stream of anhydrous hydrogen chloride bubbled into the mixture for about three hours. The organic layer was distilled.

An 80% yield (46.0 parts) of 4-heptafluoroisopropoxy-3,3,4,4-tetrafluorobutoxy methyl chloride of the formula

was obtained. The product was a colorless liquid and had a boiling point of 70–71° C./10 mm.

*Elemental analysis.*—Calculated for $C_8F_{11}H_6ClO_2$ (percent): C, 25.4; F, 55.2; H, 1.6; Cl, 9.4. Found (percent): C, 25.4; F, 57.3; H, 1.6; Cl, 9.6.

The structure was confirmed by infrared analysis which showed —$CH_2$— absorption at 3.4 and 3.48 microns, C–F absorption at 7.5–9.0 microns and an ether absorption at 10.1 microns. No alcoholic —OH group absorption was found.

EXAMPLE 2

Anhydrous hydrogen chloride was bubbled into a mixture containing 10 parts of water, 6 parts of the alcohol prepared as in Example 1, 0.6 part of paraformaldehyde and 0.5 part of zinc chloride for about 5 hours. The temperature was maintained at about 10° C. throughout. After removing excess hydrogen chloride with nitrogen, the organic layer was collected and dried over sodium sulfate.

A 60% yield (4.2 parts) of the methyl chloride of Example 1 was obtained. The structure was confirmed by infrared analysis.

EXAMPLE 3

Anhydrous hydrogen chloride was bubbled into a mixture containing 1.2 parts of trioxane, 6.6 parts of the alcohol prepared as in Example 1, 1.3 parts of zinc chloride and 11.2 parts of trichlorotrifluoroethane for about 45 minutes. The product was separated and dried, and confirmed as the methyl chloride of Example 1.

EXAMPLE 4

A mixture of 4.2 parts of the methyl chloride obtained as in Example 1 and 0.88 part of pyridine was reacted for 20 minutes. The temperature rose to about 40° C. The white, sticky, semi-solid precipitate was triturated with two 25 parts by volume portions of ether and dried under vacuum.

A 27% yield (1.65 parts) of 4-heptafluoroisopropoxy- 3,3,4,4-tetrafluorobutoxy methyl pyridinium chloride of the formula

was obtained. The structure was confirmed by infrared analysis which showed absorption at 6.15 and 6.75 microns characteristic of the pyridinium function, an envelope of bands at 7.5–9.0 microns characteristic of C–F absorption and ether absorption at 10.1 microns.

*Elemental analysis.*—Calculated for $C_{13}F_{11}H_{11}ClNO_2$ (percent): C, 34.1; F, 45.7; H, 2.4; Cl, 7.7; N, 3.1. Found (percent): C, 33.1; F, 47.2; H, 2.6; Cl, 7.5; N, 2.9.

EXAMPLE 5

A solution of 12.5 parts of the methyl chloride prepared as in Example 1 in 7.8 parts of benzene was treated with 2.64 parts of pyridine.

An improved yield of 85% (12.6 parts) of the pyridinium chloride product was obtained. The structure was confirmed by infrared analysis.

EXAMPLE 6

A solution of 7.57 parts of the methyl chloride prepared as in Example 1 in 11.2 parts of trichlorotrifluoroethane was treated with 1.58 parts of pyridine.

An improved yield of 92% (8.4 parts) of the pyridinium chloride product was obtained.

EXAMPLE 7

While maintaining the temperature at between 90–100° C., 190 parts of 10-heptafluoroisopropoxy-1H,1H,2H,2H-perfluorodecyl iodide were added to 380 parts of 20% oleum over two hours. The resultant mixture was poured into 1245 parts of water containing 25 parts of sodium thiosulfate. The hydrolyzed mixture was maintained at 100° C. for three hours and cooled. The organic phase was taken up in ether, dried, and the ether flashed off.

Distillation of the oily residue gave 126 parts (77% yield) of an alcohol of the formula $$(CF_3)_2CFO(CF_2CF_2)_4CH_2CH_2OH$$

having a boiling point of 99–101° C./4 mm.

Hydrogen chloride was bubbled into a mixture containing 27.8 parts of the alcohol prepared as above, 11 parts of benzene, 2.91 parts of trioxane and 5 parts of zinc chloride.

A 70% yield of 10-heptafluoroisopropoxy-1H,1H,2H,2H-perfluorodecyloxy methyl chloride of the formula $$(CF_3)_2CFO(CF_2CF_2)_4CH_2CH_2OCH_2Cl$$

was obtained. The structure was confirmed by infrared analysis.

EXAMPLE 8

A solution containing 19 parts of the methyl chloride prepared in Example 7 was treated with 2.83 parts of pyridine.

An 86% yield (18.5 parts) of 10-heptafluoroisopropoxy-1H,1H,2H,2H-perfluorodecyloxy methyl pyridinium chloride of the formula

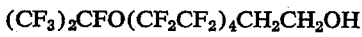

was obtained as a soft white solid having a melting point of 80° C. The product dissolved readily in water. The structure was confirmed by infrared analysis.

*Elemental analysis.*—Calculated for $C_{19}F_{23}H_{11}ClN_2$ (percent): C, 30.5; F, 57.7; H, 1.5; Cl, 4.7; N, 1.9. Found (percent): C, 28.0; F, 60.8; H, 1.3; Cl, 3.6; N, 1.6.

EXAMPLE 9

A mixture of 94 parts of trichlorotrifluoroethane and 0.32 part of zinc chloride was saturated with anhydrous hydrogen chloride. A small amount (0.14 part) of trioxane was added and the mixture stirred for about 15 minutes.

A solution of 2 parts of a mixture of alcohols, 72% of $(CF_3)_2CFO(CF_2CF_2)_6CH_2CH_2OH$ and 28% of $$(CF_3)_2CFO(CF_2CF_2)_6(CH_2CH_2)_2OH$$

prepared in a manner similar to that of the alcohol of Example 7 in 46.8 parts of trichlorotrifluoroethane was added dropwise. Hydrogen chloride was bubbled through the mixture for 5 hours and the product was distilled.

A mixture of 72% of 14-heptafluoroisopropoxy-1H,1H,2H,2H-perfluorobutadecyloxymethyl chloride, $$(CF_3)_2CFO(CF_2CF_2)_6CH_2CH_2OCH_2Cl$$

and 28% of 16-heptafluoroisopropoxy-1H,1H,2H,2H,3H,3H,4H,4H-perfluorohexadecyloxy methyl chloride, $$(CF_3)_2CFO(CF_2CF_2)_6(CH_2CH_2)_2OCH_2Cl$$

was obtained as a soft, white solid having a melting point of 65° C. The structure was confirmed by infrared analysis.

EXAMPLE 10

A solution of 10 parts of the methyl chlorides prepared as in Example 9 and 140 parts of trichlorotrifluoroethane was treated with 0.94 part of pyridine.

The corresponding salts, a mixture of 14-heptafluoroisopropoxy-1H,1H,2H,2H - perfluorobutadecyloxy methyl pyridinium chloride of the formula

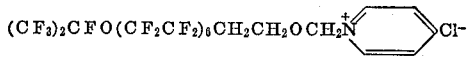

and 16 - heptafluoroisopropoxy - 1H,1H,2H,2H,3H,3H,4H,4H-perfluorohexadecyloxy methyl pyridinium chloride of the formula

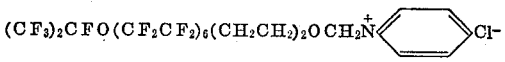

were obtained as a white solid having a melting point of 130° C. The structure was confirmed by infrared analysis. The salt mixture was readily soluble in water.

EXAMPLE 11

A mixture of 210 parts of 4-heptafluoroisopropoxyperfluorobutyl iodide, 90 parts of undecylenic alcohol and one part of α,α'-azobisisobutyronitrile catalyst was charged to a vessel and heated at 70–75° C. for 12 hours.

Upon distillation of the product, 228 parts of an iodo alcohol of the formula $$(CF_3)_2CFO(CF_2CF_2)_2CH_2CHI(CH_2)_9OH$$

were obtained. This product was taken up in 300 parts of anhydrous ether and the solution added slowly to a slurry of 32 parts of LiAlH$_4$ in 500 parts by volume of ether. The mixture was refluxed overnight. Ethyl acetate and sulfuric acid were added to decompose excess LiAlH$_4$ and the ether flashed off the organic layer.

Upon distillation, 131 parts of an alcohol of the formula $$(CF_3)_2CFO(CF_2CF_2)_2(CH_2)_{11}OH$$

were obtained having a boiling point of 110° C./0.5 mm.

A slurry of 30 parts of trichlorotrifluoroethane and 1.36 parts of zinc chloride was saturated with hydrogen chloride, and 0.60 part of trioxane added. A solution of 5.65 parts of the alcohol prepared as above in 20 parts of trichlorotrifluoroethane was added and hydrogen chloride bubbled in the mixture for 5 hours. The solvent was evaporated from the organic layer.

An 80% yield of the desired compound, 15-heptafluoroisopropoxy - 12,12,13,13,14,14,15,15 - octafluoropentadecyloxy methyl chloride of the formula $$(CF_3)_2CFO(CF_2CF_2)_2(CH_2)_{11}OCH_2Cl$$

was obtained as a white solid. The structure was confirmed by infrared analysis.

EXAMPLE 12

A solution of 5.2 parts of the methyl chloride prepared as in Example 11 in 46 parts of trichlorotrifluoroethane was treated with 0.79 part of pyridine.

A 40% yield of the desired product, 15-heptafluoroisopropoxy - 12,12,13,13,14,14,15,15 - octafluoropentadecyloxy methyl pyridinium chloride of the formula

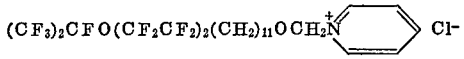

was obtained as a viscous liquid. The structure was confirmed by infrared analysis. The product was completely soluble in water.

EXAMPLE 13

Following the procedure of Example 11, the alcohol of the formula $$(CF_3)_2CFO(CF_2CF_2)_3(CH_2)_{11}OH$$

was prepared substituting the appropriate iodide. The corresponding methyl chloride was prepared using 0.36 part of trioxane, 3.92 parts of the alcohol, zinc chloride and a total of 50 parts of trichlorotrifluoroethane.

A 93% yield of 17-heptafluoroisopropoxy-12,12,13, 13,14,14,15,15,16,16,17,17 - dodecafluoroheptadecyloxy methyl chloride of the formula $$(CF_3)_2CFO(CF_2CF_2)_3(CH_2)_{11}OCH_2Cl$$

was obtained. The structure was confirmed by infrared analysis.

EXAMPLE 14

A solution of 3.92 parts of the methyl chloride prepared as in Example 13 in 46 parts of trichlorotrifluoroethane was treated with 0.47 part of pyridine.

The corresponding salt, 17-heptafluoroisopropoxy-12, 12,13,13,14,14,15,15,16,16,17,17 - dodecafluoroheptadecyloxy methyl pyridinium chloride was obtained in 63% yield as a soft solid having a melting point of 62° C.

The structure

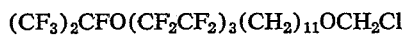

was confirmed by infrared analysis.

EXAMPLE 15

A mixture of 6 parts of the alcohol prepared as in Example 1, 1.8 parts of paraformaldehyde and 15 parts of pyridine was heated to 80° C. Sulfur dioxide was bubbled in for 45 minutes. The mixture was cooled to 0° C., 20 parts by volume of ether added and let stand for several hours. A brown oily layer settled out, was separated, triturated with ether and dried.

The product obtained (3.5 parts) was a mixture of 1-(4-heptafluoroisopropoxy - 3,3,4,4 - tetrafluorobutoxy methyl pyridinium pyridine sulfite of the structure

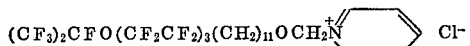

and 1-(4-heptafluoroisopropoxy-3,3,4,4-tetrafluorobutoxy methyl pyridinium pyridine pyrosulfite of the structure

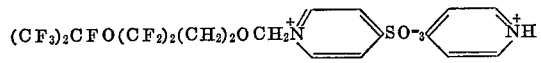

The structures were confirmed by infrared analysis.

EXAMPLE 16

The procedure of Example 15 was followed substituting 4.32 parts of potassium sulfite for the sulfur dioxide. After maintaining the mixture at 80° C. for three hours the product was triturated with ether.

The desired sulfite and pyrosulfite products were obtained as confirmed by infrared analysis.

EXAMPLE 17

An alcohol of the formula $$(CF_3)_2CFO(CF_2CF_2)_4CH_2CH_2OH$$

(6.3 parts) was admixed with one part of paraformaldehyde and 8 parts of pyridine and heated to 80° C. Sulfur dioxide was bubbled in for 45 minutes and the product triturated with ether.

A water soluble mixture of the products 1-(10-heptafluoroisopropoxy - 1H,1H,2H,2H - perfluorodecyloxy methyl)pyridinium pyridine sulfite of the formula

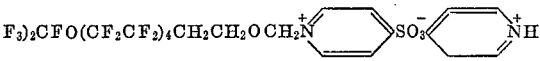

and 1-(10-heptafluoroisopropoxy - 1H,1H,2H,2H - perfluorodecyloxymethyl)pyridinium pyridine pyrosulfite of the formula

was obtained as confirmed by infrared analysis.

EXAMPLE 18

The pyridinium chloride of an alcohol of the formula $$(CF_3)_2CFO(CF_2CF_2)_4(CH_2)_{11}OH$$

prepared according to the general procedure given in Example 11, was prepared.

The structure of the product have the formula

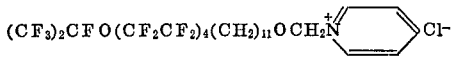

was confirmed by infrared analysis.

EXAMPLE 19

A solution of 7.57 parts of 4-heptafluoroisopropoxy-3,3,4,4-tetrafluorobutoxy methyl chloride prepared as in Example 1 in 30 parts of trichlorotrifluoroethane was treated with 2.6 parts of quinoline.

A 90% yield (9.18 parts) of 1-(4-heptafluoroisopropoxy-3,3,4,4-tetrafluorobutoxy methyl) quinolinium chloride of the formula

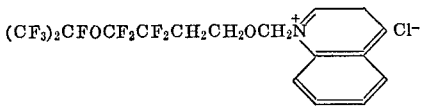

was obtained as a light brown, sticky solid with a melting point of 29–30° C. The structure was confirmed by infrared analysis which in addition to the characteristic C–F and ether absorption showed absorption at 6.15 and 6.55 microns characteristic of the quinolinium group.

EXAMPLE 20

A solution of 7.57 parts of 4-heptafluoroisopropoxy-3,3,4,4-tetrafluorobutoxy methyl chloride prepared as in Example 1 in 30 parts of trichlorotrifluoroethane was treated with 1.52 parts of triethylamine.

4 - Heptafluoroisopropoxy - 3,3,4,4 - tetrafluorobutoxy methyl triethyl ammonium chloride of the formula $$(CF_3)_2CFOCF_2CF_2CH_2CH_2OCH_2\overset{+}{N}(C_2H_5)_3Cl^-$$

(8.2 parts) was obtained as an off-white, sticky solid with a melting point of 29° C. The structure was confirmed by infrared analysis which showed absorption at 6.8 to 6.95 microns characteristic of ethyl groups in addition to the characteristic C–F and ether absorption.

The product was readily soluble in water.

EXAMPLE 21

A solution of 7.57 parts of 4-heptafluoroisopropoxy-3,3,4,4-tetrafluorobutoxy methyl chloride prepared as in Example 1 in 30 parts of trichlorotrifluoroethane was treated with 2.02 parts of thiourea.

An 80% yield (7.18 parts) of 1-(4-heptafluoroisopropoxy-3,3,4,4-tetrafluorobutoxy methyl)thiouronium chloride of the formula

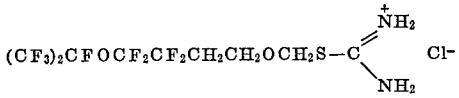

was obtained as an off-white, granular solid with a melting point of 95° C. The structure was confirmed by infrared analysis which showed isothiouronium absorption at 6.1–6.2 microns in addition to the characteristic C–F and ether absorption.

The product was readily soluble in water.

EXAMPLE 22

Zinc chloride (20.4 parts) was added to 100 parts by volume of trichlorotrifluoroethane with stirring. The solution was saturated with hydrogen chloride. Nine parts of trioxane was stirred in and a solution of 113.4 parts of $(CF_3)_2CFO(CF_2CF_2)_4(CH_2)_{11}OH$ in 50 parts by volume of trichlorotrifluoroethane added dropwise. Hydrogen chloride was bubbled through the reaction mixture for four hours.

The resultant product

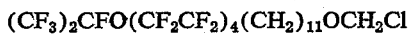

$(CF_3)_2CFO(CF_2CF_2)_4(CH_2)_{11}OCH_2Cl$ was stirred with 9.75 parts of N,N,N′,N′-tetramethyl-1,3-propane diamine for 30 minutes. The solvent was evaporated, the crude product triturated with acetonitrile and dried under vacuum.

A 99% yield (129.8 parts) of the product of the formula

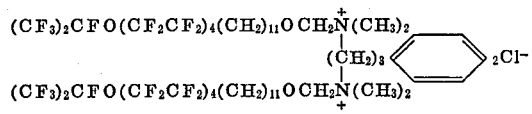

was obtained. The product was a white solid which was soluble in water. The structure was confirmed by infrared analysis.

EXAMPLE 23

Following the general procedure of Example 1, a chloromethyl ether of the formula

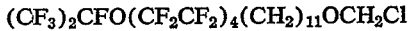

$(CF_3)_2CFO(CF_2CF_2)_4(CH_2)_{11}OCH_2Cl$ was prepared from 1.8 parts of trioxane, 4.1 parts of zinc chloride and 22.7 parts of the corresponding alcohol in 175 parts of trichlorotrifluoroethane.

A one-third portion of the chloromethyl ether was stirred with a solution of 1.5 parts of triethanolamine in 10 parts of chloroform. After 30 minutes the solvents were evaporated and the product dried. The product had the formula

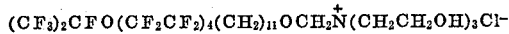

$(CF_3)_2CFO(CF_2CF_2)_4(CH_2)_{11}OCH_2\overset{+}{N}(CH_2CH_2OH)_3Cl^-$

EXAMPLE 24

A one-third portion of the chloromethyl ether of Example 23 was stirred with a solution of 1.9 parts of $H_2N(CH_2CH_2NH)_4H$ in 10 parts of chloroform. A mixture of the corresponding secondary and tertiary amine hydrochlorides was obtained.

EXAMPLE 25

A one-third portion of the chloromethyl ether of Example 23 was stirred with a solution of 0.44 part of an aziridine polymer having recurring units of the formula $$-CH_2CH_2N-\\ \;\;\;\;\;\;\;\;\;\;\;\;\;|\\ \;\;\;\;\;\;\;CH_2CH_2OH$$

in 10 parts of chloroform. The corresponding tertiary polyamine hydrochloride was obtained.

EXAMPLE 26

The compounds of the invention were tested as oil and water repellency agents for fabrics as follows: pieces of 80 x 80 cotton print cloth were soaked for 1 minute in 4% aqueous or solvent solution. The cloth was squeezed to remove excess solution and air dried.

Water repellency was determined according to the spray test, Method No. 22–52 published in the 1952 edition of the Technical Manual and Yearbook of the American Association of Textile Chemists and Colorists, vol. 28 page 130. Good water repellants have ratings between about 70–100.

The procedure employed in determining the oil repellency ratings is described in the Textile Research Journal, on pages 323–4 of the April 1962 edition. Drops of mixtures of mineral oil ("Nujol") and n-heptane are gently placed on the treated fabrics. After 3 minutes the wetting and penetration of the fabric is observed visually. The number corresponding to the mixture containing the highest percentage of heptane which does not penetrate or wet the fabric is taken as the oil repellency rating of the treated fabric. A rating of about 90 or higher is considered excellent. The results are given below.

| Compound | Solvent | Water repellency rating | Oil repellency rating |
|---|---|---|---|
| 72% $(CF_3)_2CFO(CF_2)_{12}(CH_2)_2OCH_2Cl$<br>28% $(CF_3)_2CFO(CF_2)_{12}(CH_2)_4OCH_2Cl$ | Acetone | 90 | 120 |
| $(CF_3)_2CFO(CF_2)_4(CH_2)_{11}OCH_2Cl$ | do | 100 | 60 |
| $(CF_3)_2CFO(CF_2)_4(CH_2)_{11}OCH_2\overset{+}{N}\!\!\diagup\!\!\diagdown Cl^-$ | Water | 60 | 100 |
| $(CF_3)_2CFO(CF_2)_6(CH_2)_{11}OCH_2Cl$ | Acetone | 100 | 60 |
| $(CF_3)_2CFO(CF_2)_6(CH_2)_{11}OCH_2\overset{+}{N}\!\!\diagup\!\!\diagdown Cl^-$ | Water | >90 | 100 |
| $(CF_3)_2CFO(CF_2)_8(CH_2)_{11}OCH_2\overset{+}{N}\!\!\diagup\!\!\diagdown Cl^-$ | do | 100 | 130 |

EXAMPLE 27

A 2% aqueous solution of

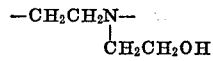

$(CF_3)_2CFO(CF_2CF_2)_4(CH_2)_{11}OCH_2-\overset{+}{N}(CH_2CH_2OH)_3Cl^-$ as prepared in Example 23 was applied to cotton cloth to a 70% weight pickup. The cloth was then oven dried, ironed at 235° F. and tested for oil and water repellency. The cloth was then washed in a standard home washing machine, dried and ironed and retested. The durability of the treated cloth was determined after dry cleaning. The results are given below.

| | Water repellency rating | Oil repellency rating |
|---|---|---|
| Initial | 100 | 110 |
| One laundering | 80 | 110 |
| Three launderings | 80 | >100 |
| Five launderings | 80 | 100 |
| One dry cleaning | 80 | 60 |

EXAMPLE 28

The salts of the invention were tested as external paper sizes to impart oil, water and ink resistance to paper. Paper hand sheets obtained from a 50:50 mixture of hard and soft wood pulps were dipped into aqueous solutions of the salts, dried and aged at room temperature for 16 hours.

The water repellency of treated papers is determined according to standard test T441-os-63 of the Technical Association of the Pulp and Paper Industry (Cobb Test). This test determines the amount of water absorbed by the paper after two minutes.

The oil resistance of treated papers is determined by the kit test as follows: A kit of 12 solutions of varying proportions of castor oil, toluene and heptane is prepared, as set forth in the following table.

| Kit No. | Parts by volume of— | | |
|---|---|---|---|
| | Castor oil | Toluene | Heptane |
| 1 | 200 | 0 | 0 |
| 2 | 180 | 10 | 10 |
| 3 | 160 | 20 | 20 |
| 4 | 140 | 30 | 30 |
| 5 | 120 | 40 | 40 |
| 6 | 100 | 50 | 50 |
| 7 | 80 | 60 | 60 |
| 8 | 60 | 70 | 70 |
| 9 | 40 | 80 | 80 |
| 10 | 20 | 90 | 90 |
| 11 | 0 | 100 | 100 |
| 12 | 0 | 90 | 110 |

The kit value is the highest numbered solution that will stand on the surface to be tested in the form of a drop for 15 seconds, with no penetration of the solution, noted by any darkening of the area under the drop.

The ink resistance of treated papers is determined by the ink flotation test according to the following procedure: a 1.5 inch square of treated paper is folded to turn up all the edges. The square is floated on standard writing ink. The time in seconds required for the ink to penetrate evenly to the upper surface of the paper is noted as the ink penetration. A time of 900 seconds or longer denotes excellent ink resistance. The results are summarized below.

| Compound | Concentration, percent | Surface tension |
|---|---|---|
| Water control | | 72 |
| $(CF_3)_2CFO(CF_2)_2(CH_2)_2OCH_2\overset{+}{N}C_5H_5\ Cl^-$ | 1.0 | 26 |
| | 0.5 | 34.4 |
| | 0.1 | 42.8 |
| | 0.05 | 42.8 |
| | 0.01 | 44.2 |
| $(CF_3)_2CFO(CF_2)_2(CH_2)_2OCH_2\overset{+}{N}C_{10}H_7\ Cl^-$ | 1.0 | 19.0 |
| | 0.5 | 20.5 |
| | 0.1 | 27.2 |
| | 0.5 | 30.2 |
| | 0.01 | 38.8 |
| $(CF_3)_2CFO(CF_2)_2(CH_2)_2OCH_2\overset{+}{N}(C_2H_5)_3Cl^-$ | 1.0 | 18.1 |
| | 0.5 | 22.4 |
| | 0.1 | 28.8 |
| | 0.05 | 32.8 |
| | 0.01 | 41.5 |
| $(CF_3)_2CFO(CF_2)_2(CH_2)_2OCH_2S-C(=NH_2)NH_2\ Cl^-$ | 1.0 | 32.4 |
| | 0.5 | 37.0 |
| | 0.1 | 43.5 |
| | 0.05 | 44.8 |
| | 0.01 | 44.8 |
| $(CF_3)_2CFO(CF_2)_8(CH_2)_2OCH_2\overset{+}{N}C_5H_5\ Cl^-$ | 1.0 | 18.8 |
| | 0.5 | 19.6 |
| | 0.1 | 18.2 |
| | 0.05 | 25.8 |
| | 0.01 | 25.0 |
| $(CF_3)_2CFO(CF_2)_8(CH_2)_{11}OCH_2\overset{+}{N}C_5H_5\ Cl^-$ | 1.0 | 15.8 |
| | 0.5 | 19.8 |
| | 0.1 | 19.8 |
| | 0.05 | 19.4 |
| | 0.01 | 18.2 |
| $(CF_3)_2CFO(CF_2)_8(CH_2)_{11}OCH_2\overset{+}{N}C_5H_5\ Cl^-$ | 1.0 | 35.2 |
| | 0.5 | 35.2 |
| | 0.1 | 38.3 |
| | 0.05 | 43.8 |
| | 0.01 | 51.5 |
| 72% $(CF_3)_2CFO(CF_2)_{12}(CH_2)_2OCH_2\overset{+}{N}C_5H_5\ Cl^-$ | 1.0 | 33.2 |
| | 0.5 | 34.5 |
| 28% $(CF_3)_2CFO(CF_2)_{12}(CH_2)_4OCH_2\overset{+}{N}C_5H_5\ Cl^-$ | 0.1 | 46.4 |
| | 0.05 | 57.8 |
| | 0.01 | 60.0 |

| Compound | Concentration, percent | Kit No. | Ink resistance | Cobb size |
|---|---|---|---|---|
| $(CF_3)_2CFO(CF_2)_8(CH_2)_{11}OCH_2\overset{+}{N}C_5H_5\ Cl^-$ | 0.5 | 7 | >900 | Very good. |
| 72% $(CF_3)_2CFO(CF_2)_{12}(CH_2)_2OCH_2\overset{+}{N}C_5H_5\ Cl^-$ 28% $(CF_3)_2CFO(CF_2)_{12}(CH_2)_4OCH_2\overset{+}{N}C_5H_5\ Cl^-$ | 0.25 | 6 | >900 | Good. |
| $(CF_3)_2CFO(CF_2)_8(CH_2)_{11}OCH_2\overset{+}{N}(CH_3)_2$<br>                $(CH_2)_3C_5H_4N\ 2Cl^-$<br>$(CF_3)_2CFO(CF_2)_8(CH_2)_{11}OCH_2\overset{+}{N}(CH_3)_2$ | 0.5<br>*0.25 | >12<br>9 | >900<br>>900 | Very good<br>Good. |

*Cured at 110° C. for one hour.

EXAMPLE 29

The salts of the invention are highly effective surfactants. Various compounds of the invention were added to water and the surface tension of the solution measured at 25° C. using a du Nouy tensiometer. The results are expressed in dynes/cm.

EXAMPLES 30–43

Halomethyl ethers and their quaternary ammonium salts are prepared according to procedures described above and are effective surface active agents and oil repellent compounds. The structural formulas of the quaternary ammonium compounds are set forth below.

Example 30

$(CF_3)_2CFOCF_2CH_2OCH_2\overset{+}{N}C_5H_5 \ Cl^-$

Example 31

$$\begin{array}{c}CF_3\\ |\\ CF_3-C-F\\ |\\ CF_3\\ |\\ F-C-O-CF_2CF_2CH_2CH_2OCH_2\overset{+}{N}C_5H_5 \ Cl^-\\ |\\ CF_3\\ |\\ CF_3-C-F\\ |\\ CF_3\end{array}$$

Example 32

$$\begin{array}{c}CF_3CF_2\\ \diagdown\\ C-F\\ \diagup\\ CF_3\\ |\\ F-C-O-CF_2CF_2CH_2CH_2OCH_2\overset{+}{N}(CH_3)_3 \ I^-\\ |\\ CF_3CF_2\\ \diagdown\\ C-F\\ \diagup\\ CF_3\end{array}$$

Example 33

$$\begin{array}{c}CF_3CF_2\\ \diagdown\\ C-F\\ \diagup\\ CF_3CF_2\\ |\\ F-C-O-(CF_2CF_2)_4(CH_2)_{11}OCH_2\overset{+}{N}(C_2H_5)_3 \ Cl^-\\ |\\ CF_3CF_2\\ \diagdown\\ C-F\\ \diagup\\ CF_3CF_2\end{array}$$

Example 34

$$\begin{array}{c}CF_2\\ \diagup\\ (CF_2)_3 \ F-C-O-(CF_2CF_2)_2(CH_2CH_2)_2OCH_2\overset{+}{N}(C_2H_5)_3 \ Cl^-\\ \diagdown\\ CF_2\end{array}$$

Example 35

$$\begin{array}{c}CF_3\\ |\\ C-F\\ |\\ Cl\\ |\\ F-C-O-CF_2CF_2CH_2CH_2OCH_2\overset{+}{N}C_5H_5 \ Cl^-\\ |\\ CF_3\\ |\\ C-F\\ |\\ F\end{array}$$

Example 36

$$\begin{array}{c}F\\ |\\ C-F\\ |\\ Cl\\ |\\ F-C-O-(CF_2CF_2)_3CH_2CH_2OCH_2\overset{+}{N}C_5H_5 \ Cl^-\\ |\\ F\\ |\\ C-F\\ |\\ Cl\end{array}$$

Example 37

$$\begin{array}{c}CF_3\\ |\\ F-C-O-(CF_2CF_2)_4CH_2CH_2OCH_2\overset{+}{N}(CH_3)_3 \ Br^-\\ |\\ Cl-CF_2\end{array}$$

Example 38

$(CF_3)_2CFOCF_2CF_2(CFClCF_2)_2CH_2CH_2OCH_2\overset{+}{N}C_5H_5 \ Cl^-$

Example 39

$(CF_3)_2CFO(CF_2)_5(CH_2)_5OCH_2\overset{+}{N}\begin{matrix}(C_2H_5OH)_2\\ \\ C_6H_{11}\end{matrix}$

Example 40

$(CF_3)_2CFO(CF_2)_{10}(CH_2)_{10}OCH_2\overset{+}{N}\begin{matrix}(C_2H_5OH)_2\\ \\ C_6H_4CH_3\end{matrix} \ Cl^-$

Example 41

$(CF_3)_2CFO(CF_2)_2(CH_2)_2OCH_2\overset{+}{N}\begin{matrix}H \\ \\ \text{piperazine-NH}\end{matrix} \ Cl^-$

Example 42

$(CF_3)_2CFO(CF_2)_2(CH_2)_2OCH_2\overset{+}{\underset{H_2}{N}}-(CH_2)_3N\begin{matrix}\text{piperidinyl}\\ |\\ (CH_2)_3\\ |\\ NH_2\end{matrix} \ Cl^-$

Example 43

$(CF_3)_2CFO(CF_2)_2(CH_2)_2OCH_2\overset{+}{\underset{H_2}{N}}-(CH_2)_3-N\begin{matrix}\text{piperazinyl}\\ |\\ (CH_2)_3\\ |\\ \overset{+}{N}H_2\end{matrix} \ 2Cl^-$ $(CF_3)_2CFO(CF_2)_2(CH_2)_2OCH_2-\overset{+}{N}H_2$ It will be apparent that numerous modifications and variations may be effected without departing from the novel concepts of the present invention, and the illustrative details disclosed are not to be construed as imposing undue limitations on the invention.

We claim:

1. A compound of the formula $$R'_fQA$$

wherein $R'_f$ is $$\begin{array}{c}R_1\\ |\\ C-F\\ |\\ R_2\\ |\\ F-C-O-(CF_2)_r\left(\begin{matrix}Z_1 & Z_2\\ | & |\\ C-C\\ | & |\\ Z_2 & Z_4\end{matrix}\right)_m\left(\begin{matrix}X_1 & X_3\\ | & |\\ C-C\\ | & |\\ X_2 & X_4\end{matrix}\right)_n(CH_2)_pOCH_2-\\ |\\ R_1\\ |\\ C-F\\ |\\ R_2\end{array}$$

wherein $R_1$ and $R_2$ independently at each occurrence can be fluorine, chlorine, perfluoroalkyl or together can form a cyclic perfluoroalkylene group with the proviso that $R_1$ and $R_2$ cannot both be chlorine; $Z_1$, $Z_2$, $Z_3$ and $Z_4$ independently can be fluorine, chlorine, or hydrogen with the proviso that no more than two of $Z_1$–$Z_4$ are chlorine; $X_1$, $X_2$, $X_3$ and $X_4$ independently can be fluorine, chlorine or hydrogen with the proviso that no more than one of $X_1$–$X_4$ is chlorine; $r$ is an integer from 0–1; 0–10; $p$ is an integer from 0–1 with the proviso that when $p$ is 0, $n$ must be at least one and $X_3$ and $X_4$ must be hydrogen; Q is the positively charged residue of a pyridine quaternizing agent and, A is an accompanying anion with the proviso that when the number of negative charges of A exceeds the positive charge of $R'_fQ$, the excess negative charge is satisfied by cations selected from the group consisting of $R'_fQ$ and a positively charged protonated tertiary amine cation.

2. A compound according to claim 1 wherein $m$ and $n$ are integers from 0–10.

3. A compound according to claim 1 wherein $R_f$ is of the formula

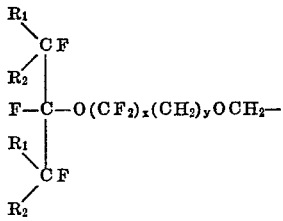

wherein $R_1$ and $R_2$ independently can be fluorine, chlorine or perfluoroalkyl of 1–2 carbon atoms with the proviso that both $R_1$ and $R_2$ are not chlorine; $x$ and $y$ are integers from 1–20 and Q and A have the aforesaid meanings.

4. A compound according to claim 1 wherein QA is pyridinium chloride.

5. A compound according to claim 1 wherein QA is selected from the group consisting of

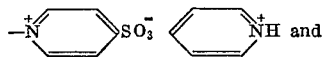 and

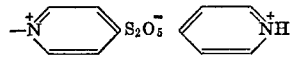

6. A compound according to claim 4 of the formula

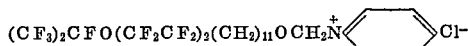

7. A compound according to claim 4 of the formula

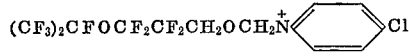

8. A compound according to claim 4 of the formula

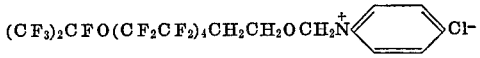

9. A compound according to claim 4 of the formula

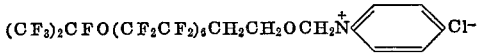

10. A compound according to claim 4 of the formula

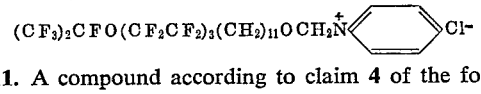

11. A compound according to claim 4 of the formula

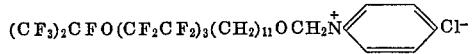

References Cited

UNITED STATES PATENTS 3,510,494    5/1970    Gagliardi _____ 260—295

ALAN L. ROTMAN, Primary Examiner

U.S. Cl. X.R.

8—116.2; 117—138.5; 252—19, 21; 260—247.7 A, 268 R, 286 Q, 294.7 M, 564 E, 567.6 MB